United States Patent
Dziong

(10) Patent No.: US 8,218,474 B2
(45) Date of Patent: Jul. 10, 2012

(54) BANDWIDTH ALLOCATION IN SATELLITE COMMUNICATION NETWORKS

(75) Inventor: Zbigniew Dziong, Montréal (CA)

(73) Assignee: SOCOVAR S.E.C., Montreal, Quebec (CA)

(*) Notice: Subject to any disclaimer, the term of this patent is extended or adjusted under 35 U.S.C. 154(b) by 426 days.

(21) Appl. No.: 12/620,978

(22) Filed: Nov. 18, 2009

(65) Prior Publication Data

US 2010/0128659 A1     May 27, 2010

Related U.S. Application Data

(60) Provisional application No. 61/115,715, filed on Nov. 18, 2008.

(51) Int. Cl.
  *H04B 7/185* (2006.01)
  *H04B 7/204* (2006.01)
(52) U.S. Cl. .......... 370/316; 370/319; 370/322; 455/428
(58) Field of Classification Search .................. None
  See application file for complete search history.

(56) References Cited

U.S. PATENT DOCUMENTS

| | | | |
|---|---|---|---|
| 5,765,098 A | 6/1998 | Bella | |
| 5,781,540 A | 7/1998 | Malcolm et al. | |
| 5,790,939 A | 8/1998 | Malcolm et al. | |
| 5,812,545 A | 9/1998 | Liebowitz et al. | |
| 6,278,876 B1 | 8/2001 | Joshi et al. | |
| 6,879,808 B1* | 4/2005 | Nations et al. | 455/12.1 |
| 6,963,548 B1 | 11/2005 | Chang et al. | |
| 6,987,734 B2* | 1/2006 | Hundemer | 370/237 |
| 6,990,314 B1 | 1/2006 | Hagen et al. | |
| 7,027,769 B1 | 4/2006 | Rosen et al. | |
| 7,085,247 B2* | 8/2006 | Schweinhart et al. | 370/316 |
| 7,289,460 B1 | 10/2007 | Thacker et al. | |
| 7,376,418 B2 | 5/2008 | Wells | |
| 7,400,857 B2 | 7/2008 | Chang et al. | |
| 2003/0031141 A1* | 2/2003 | Schweinhart et al. | 370/316 |
| 2010/0097932 A1* | 4/2010 | Wu | 370/235 |

OTHER PUBLICATIONS

Tramantzas, Apostolos et al., "Peer-To-Peer Networks Based on Hierarchies of Trust", School of Computer Science, University of Manchester Oxford Road, Manchester, UK, Fifth IEEE International Conference on Peer-to-Peer Computing, 2005.

Schoder, Detlef et al., "Core Concepts in Peer-To-Peer Networking", University of Cologne, Germany, Idea Group Inc., 2005, Chapter 1, pp. 1-27.

Goldsmith, Andrea et al., "Cross-Layer Design of Ad-Hoc Wireless Networks for Real-Time Media", [online], [retrieved on Sep. 5, 2009], http://www.stanford.edu/~zhuxq/adhoc_project/adhoc_project.html.

(Continued)

*Primary Examiner* — Robert Scheibel
(74) *Attorney, Agent, or Firm* — Norton Rose Canada LLP

(57) ABSTRACT

There is described a method for allocating bandwidth in a satellite communication system comprising a plurality of terminals, the method comprising: at each one of the plurality of terminals: sending a local terminal bandwidth request to a centralized bandwidth manager and to all other terminals of the plurality of terminals via a satellite; receiving a centralized bandwidth allocation for a first group of applications from the centralized bandwidth manager; receiving other terminal bandwidth requests from the other terminals, extracting requests for a second group of applications, and generating a decentralized bandwidth allocation according to a set of bandwidth allocation rules common to all of the plurality of terminals; and generating a global bandwidth allocation using the centralized bandwidth allocation and the decentralized bandwidth allocation.

28 Claims, 5 Drawing Sheets

OTHER PUBLICATIONS

"Peer-To-Peer", Wikipedia, The Free Encyclopedia, [online], [retrieved on Sep. 8, 2009], http://en.wikipedia.org/wiki/Peer-to-peer.

Green, P.E. et al., "A Perspective on Advanced Peer-To-Peer Networking", IBM Systems Journal, vol. 26, No. 4, 1987, pp. 414-428.

Allen, M.O. et al., "SNA Management Services Architecture for APPN Networks", IBM Systems Journal, vol. 31, No. 2, 1992, pp. 336-352.

"Inside APPN-The Essential Guide to the Next-Generation SNA", IBM International Technical Support Organization, IBM Redbook, SG24-3669-03, Jun. 1997.

Bird, R. et al., "Advances in APPN Architecture", IBM Systems Journal, vol. 34, No. 3, 1995, pp. 430-451.

Zee, M. et al., "IBM System Z9 Open Systems Adapter for Communication Controller for Linux", IBM J. res. & Dev., vol. 51, No. 1/2, Jan./Mar. 2007, pp. 119-130.

* cited by examiner a) CBM allocation b) DBM allocation c) Final allocation

BANDWIDTH ALLOCATION IN SATELLITE COMMUNICATION NETWORKS

CROSS-REFERENCE TO RELATED APPLICATIONS

This application claims priority under 35 USC 119(e) of U.S. Provisional Patent Application No. 61/115715, filed on Nov. 18, 2008, the contents of which are hereby incorporated by reference.

TECHNICAL FIELD

The present invention relates to the field of bandwidth allocation in satellite communication systems, in particular to the allocation of bandwidth to different types of data, such as real-time data, non real-time data, etc.

BACKGROUND

In bent-pipe satellite communication systems, terminals communicate together via a satellite. The satellite is used as a repeater and sends any data received from a particular terminal back to all of the other terminals. In satellite communication systems using time division multiple access (TDMA), a single carrier frequency is shared by all of the terminals to transmit data. A hub is in charge of the bandwidth allocation. Upon reception of bandwidth requests from the terminals, the hub generates a burst plan and sends it to the terminals. The burst plan indicates at which time or burst each terminal is allowed to send data.

Because a terminal has to first send a bandwidth request to the hub and then to wait for the burst plan, large time delays are generated before a terminal can send data. These delays can cause inefficient bandwidth utilization and large transfer delays.

Therefore, there is a need for a more efficient utilization of the bandwidth in satellite communication networks.

SUMMARY

In accordance with a first broad aspect, there is provided a method for allocating bandwidth in a satellite communication system comprising a plurality of terminals, the method comprising: at each one of the plurality of terminals: sending a local terminal bandwidth request to a centralized bandwidth manager and to all other terminals of the plurality of terminals via a satellite; receiving a centralized bandwidth allocation for a first group of applications from the centralized bandwidth manager; receiving other terminal bandwidth requests from the other terminals, extracting requests for a second group of applications, and generating a decentralized bandwidth allocation according to a set of bandwidth allocation rules common to all of the plurality of terminals; and generating a global bandwidth allocation using the centralized bandwidth allocation and the decentralized bandwidth allocation.

In accordance with a second broad aspect, there is provided a terminal for use in a satellite communication system with a plurality of terminals, the terminal comprising: a request generator adapted to generate a local terminal bandwidth request, the local terminal bandwidth request comprising a request for a first group of applications and a second group of applications, and to send the local terminal bandwidth request to other terminals in the satellite communication system; a decentralized bandwidth manager adapted to receive other terminal bandwidth requests from the other terminals, extract requests for the second group of applications from the other terminal bandwidth requests and the local bandwidth request, and generate a decentralized bandwidth allocation for each one of the plurality of terminals according to a set of bandwidth allocation rules common to all of the plurality of terminals; and a bandwidth management coordinator adapted to receive a centralized bandwidth allocation applicable to the first group of applications, and to generate a global bandwidth allocation according to a set of coordination rules common to all of the plurality of terminals.

In accordance with a third broad aspect, there is provided a satellite communication system comprising: a plurality of terminals, each terminal comprising: a request generator adapted to generate a local terminal bandwidth request, the local terminal bandwidth request comprising a request for a first group of applications and a second group of applications, and to send the local terminal bandwidth request to other terminals in the satellite communication system; a decentralized bandwidth manager adapted to receive other terminal bandwidth requests from the other terminals, extract requests for the second group of applications from the other terminal bandwidth requests and the local bandwidth request, and generate a decentralized bandwidth allocation for each one of the plurality of terminals according to a set of bandwidth allocation rules common to all of the plurality of terminals; and a bandwidth management coordinator adapted to receive a centralized bandwidth allocation applicable to the first group of applications, and to generate a global bandwidth allocation according to a set of coordination rules common to all of the plurality of terminals; and a centralized bandwidth manager adapted to receive the bandwidth requests from the plurality of terminals, extract requests for the first group of applications, generate the centralized bandwidth allocation, and transmit the centralized bandwidth allocation to the plurality of terminals.

BRIEF DESCRIPTION OF THE DRAWINGS

Further features and advantages of the present invention will become apparent from the following detailed description, taken in combination with the appended drawings, in which.

DETAILED DESCRIPTION

Figure 1:
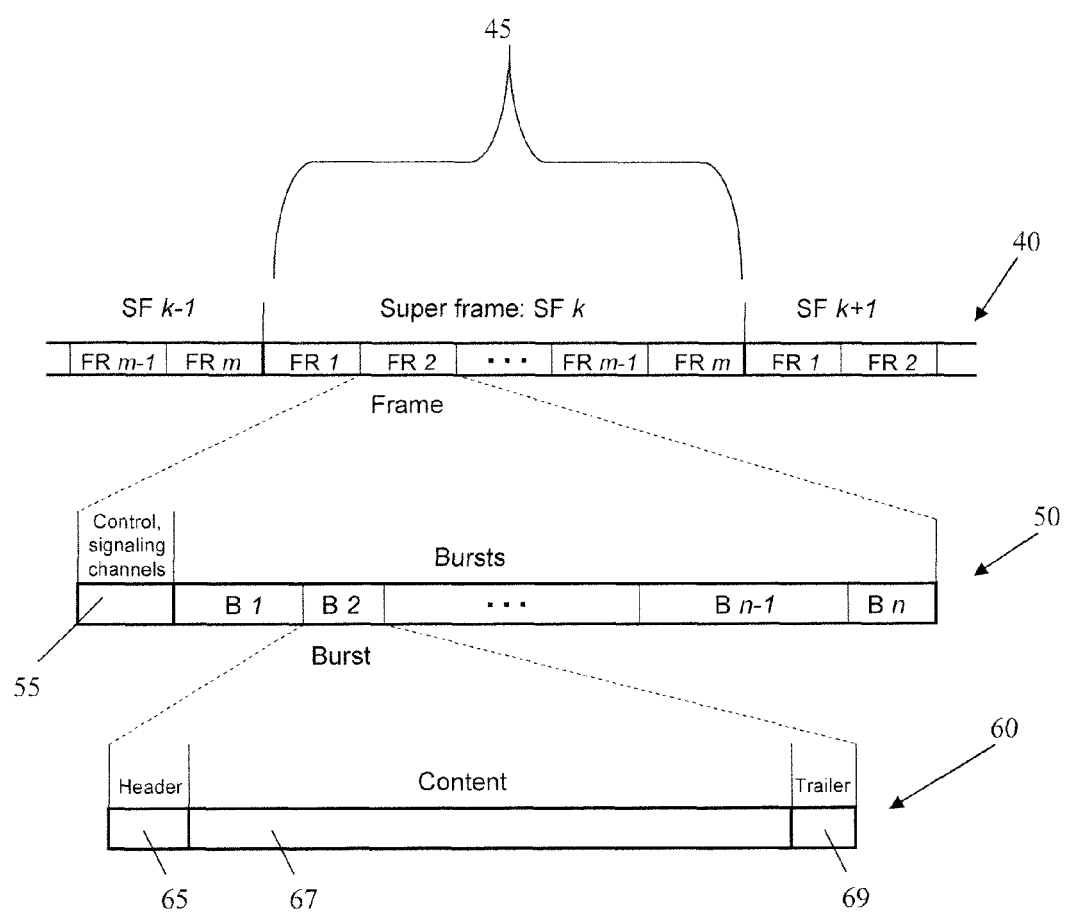
FIG. 1 illustrates a TDMA frame structure, in accordance with one embodiment.

There is described herein a satellite communication system. The system comprises a satellite and a plurality of terminals that communicate together via the satellite. In one embodiment, the transmissions from one terminal to another terminal are organized in synchronized frames which are structured in periodic super-frames, as illustrated in FIG. 1. A plurality of super-frames 45 may be grouped together to form a transmission stream 40. A super frame 40 regroups a plurality of frames 50 $FR_1, FR_2, \ldots, FR_m$. Each frame 50 may have constant signalling and control sub-frames or slots 55 that are a function of the frame's position in the super-frame 45. The signalling sub-frames 55 correspond to signalling channels which comprise bandwidth allocation and bandwidth request signalling channels. The rest of each frame 50 is divided into several data sub-frames called bursts 60.

A burst 60 may be composed of a header 65, a trailer 69, and the actual content 67. The header 65 is an indication of the beginning of a new burst 60 while the trailer is an indication of the end of a burst 60. The header contains source and destination information as well as data that describe the content 67. The trailer 69 may contain supplemental data placed at the end of the block of data being transmitted, which may contain information for the handling of the data block, or just mark its end. The content 67 may also be called the payload or body.

Each burst 60 can be allocated to any terminal 14, 16, 18 for transmission of data and can have a varying length. This burst allocation or burst plan can be changed from frame to frame and/or from super-frame to super-frame. For example, while the second burst of the second frame in super-frame $FR_k$ is allocated to terminal 16, the second burst of the second frame in super-frame $SF_{k+1}$ may be allocated to terminal 18. Alternatively, one super frame 45 is allocated to one terminal, and/or one frame 60 is allocated to one terminal.

In one embodiment, the robustness of the signalling channels is high by design, especially for the bandwidth allocation channels, in order to minimize errors in this channel, which could result in waste of bandwidth or collisions. Alternatively, various levels of robustness may be chosen for the design, as a function of the costs and the needs of the system.

In one embodiment, multi-frequency TDMA (MF/TDMA) is used by the system 10. In this case, the frames 50 and super-frames 45 are synchronous for all frequencies but the burst plans may be different from one frequency to another. A terminal can switch transmission or reception from one frequency to another between two subsequent bursts. In another embodiment, the frequencies of the burst plans can be the same. In yet another embodiment, the frequencies of the frames 50 and super-frames 45 may differ.

The length of the super-frames 45 is determined according to several factors such as the number of terminals, the signalling traffic, the bandwidth adaptation reaction time, and the like. In one embodiment, large super-frames, such as 400 ms to 2000 ms, may be desired when a large number of terminals are present in the network in order to have bursts of reasonable size. Large super-frames may also be desirable to reduce the volume of the signalling traffic. Alternatively, short super-frames, such as 100 ms to 400 ms, may be used to increase the bandwidth adaptation reaction time since the shorter the frames are, the faster the reaction time is. However, the super-frame length should not be shorter than one frame. In one embodiment, the super-frame length is larger than the propagation time between terminals. In another embodiment, the super-frame length is substantially equal to the propagation time between terminals. Alternatively, the super-frame length is substantially equal to the propagation time between terminals plus an additional time for processing the received information. For example, a super-frame length may be around 300 ms.

In one embodiment, the signalling channel 55 enclosed within each super-frame 45 allows for each terminal to broadcast bandwidth demand information to all other terminals. Furthermore, the signalling channel 55 allows for one particular terminal to send bandwidth allocations to all other terminals. While the present description refers to an out-band signalling channel, it should be understood that the use of an in-band signalling channel is also possible.

In one embodiment, each terminal is allowed to send a bandwidth request before each periodic bandwidth allocation time window (AW). A periodic bandwidth AW is a time window for which the bandwidth allocation is calculated by CBM or DBM based on the requests for this period. The AW has a length which can extend from one frame to several super-frames.

It should be understood that any TDMA structure known to a person skilled in the art may be used. In addition, the methods for management of the communication bandwidth resources described in US patent application bearing publication No. US-2007-0019605 may be used, the contents of which are hereby incorporated by reference.

Figure 2:
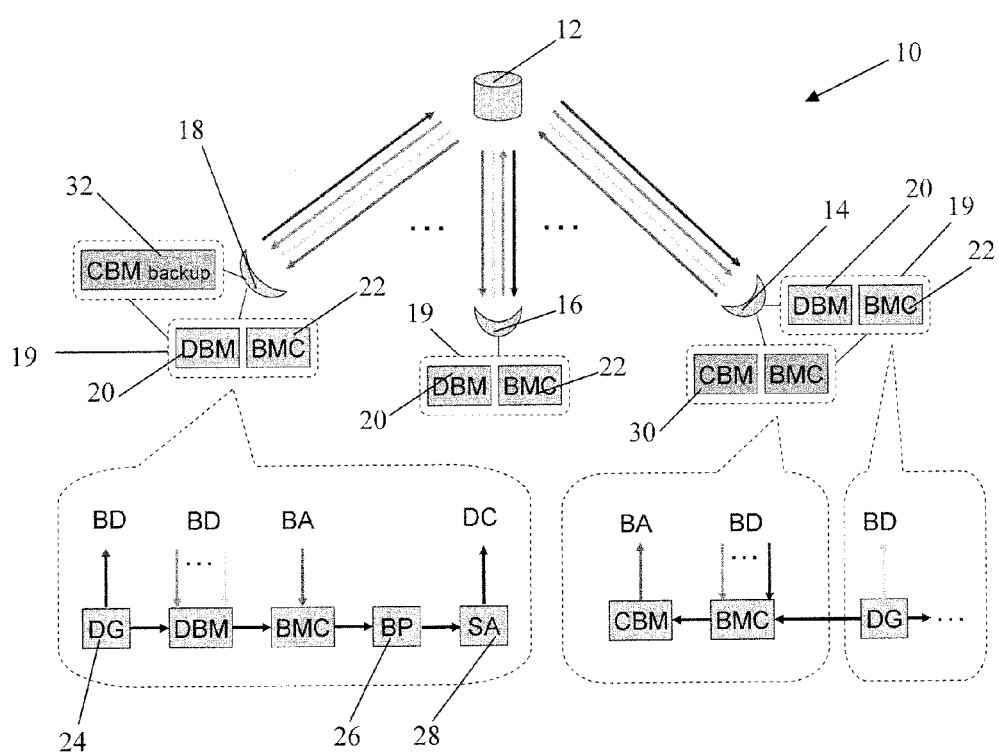
FIG. 2 illustrates a satellite communication system, in accordance with one embodiment.

FIG. 2 illustrates one embodiment of the satellite communication system 10. The system 10 comprises a satellite 12 and a plurality of terminals 14, 16, and 18. The terminals 14, 16, and 18 communicate together via the satellite 12. For example, in order to communicate with terminal 16, terminal 14 sends data to the satellite 12 which acts as a repeater and forwards the received data to all of the terminals 14, 16, 18. Therefore, terminal 16 receives the data transmitted by terminal 14. The system 10 uses TDMA and the terminals 14, 16, 18 share a single-carrier communication link for transmitting and receiving data.

Each terminal 14, 16, 18 is provided with a bandwidth module 19. Within the bandwidth module 19 are a decentralized bandwidth manager (DBM) 20 and a bandwidth management coordinator (BMC) 22. Also within the bandwidth module 19, there may be a demand generator 24, a burst plan generator 26, and a schedule generator 28, as illustrated for terminal 18 in FIG. 2. Alternatively, the functions provided by the demand generator 24, the burst plan generator 26, and the schedule generator 28 may be integrated into the DBM 20 and/or the BMC 22.

In the system 10 of FIG. 2, one terminal, in this case terminal 14, is further provided with a centralized bandwidth manager (CBM) 30. The CBM 30 is in charge of a centralized bandwidth allocation for a first group of applications for all of the terminals, while the DBM 20 of each terminal 14, 16, 18 generates a decentralized bandwidth allocation for a second group of applications, the decentralized bandwidth allocation being the same for all of the terminals 14, 16, and 18.

The demand generator 24 of each terminal 14, 16, 18 periodically generates a bandwidth request according to factors such as a local traffic estimation and a local buffer state, for example. The bandwidth request of each terminal 14, 16, 18 comprises a bandwidth request for applications of the first group (type 1) and/or the second group (type 2). Each group comprises at least one application or application type. The bandwidth request is sent to the other terminals 14, 16, 18 via the satellite 12. The bandwidth request is enclosed in the signalling channel 55 of each super-frame of the TDMA structure.

In one embodiment, the demand generator 24 generates bandwidth requests according to the current buffer state and the history of packet arrivals. The history of packet arrivals is used to predict the number of packet arrivals in the period between the request generation and the scheduling period for which this request is made.

The CBM 30 of terminal 14 receives the bandwidth requests generated by each terminal 14, 16, 18; extracts the bandwidth requests which concern the first group of applications; and generates a centralized bandwidth allocation for the first group of applications for each terminal 14, 16, 18. The centralized bandwidth allocation indicates to each terminal 14, 16, 18 the amount of bandwidth that can be used to send data related to the first group of applications. This centralized bandwidth allocation is then sent to each terminal 14, 16, 18 via the satellite 12. In one embodiment, the CBM 30 assigns a percentage of the total available bandwidth for the first group of applications to each terminal 14, 16, 18. In another embodiment, the centralized bandwidth allocation is a burst plan which can be subsequently modified by the BMC 22 or the burst plan generator 26. In this case, the signalling messages should be long enough for transmitting the burst plan.

In one embodiment, the centralized bandwidth allocation is sent via the signalling channel 55 of each super-frame of the TDMA structure. As the bandwidth allocation for the first group of applications comes from a centralized point, the potential errors in the bandwidth demand channels do not affect consistency of the bandwidth allocation. If the available bandwidth is not sufficient to accommodate the bandwidth requests, the CBM 30 may allocate the bandwidths to the terminals 14, 16, and 18 proportionally to their requests. The bandwidth allocated to a terminal 14, 16, 18 by the CBM 30 may be limited by a predetermined minimum allocation.

The DBM 20 of each terminal 14, 16, 18 receives the bandwidth requests generated by all of the terminals 14, 16, and 18. If necessary, the DBM 20 extracts a bandwidth request for the second group of applications and generates a decentralized bandwidth allocation for the local terminal and for the other terminals 14, 16, 18. The decentralized bandwidth allocation indicates the amount of bandwidth that can be used by the terminals 14, 16, 18 to send data related to the second group of applications.

In one embodiment, the DBM 20 assigns a percentage of the total available bandwidth for the second group of applications to each terminal 14, 16, 18. In another embodiment, the decentralized bandwidth allocation is a burst plan which can be subsequently modified by the BMC 22 or the burst plan generator 26. The DBM 20 of all of the terminals 14, 16, and 18 is provided with the same bandwidth allocation algorithm that calculates identical distributions of bandwidth allocation between terminals. This allocation can be proportional to the terminal demands. Various bandwidth allocation algorithms may be used, as will be understood by those skilled in the art, such as for example a weighted fair queuing algorithm, a QoS-aware dynamic bandwidth allocation algorithm, a bandwidth allocation algorithm based on proportional fairness, and other fair bandwidth allocation algorithms known from the literature.

As each DBM 20 receives the same information, namely the bandwidth requests generated by the terminals 14, 16, and 18, each DBM 20 generates the same bandwidth allocation for the second group of applications. The decentralized bandwidth allocation is then sent to the local BMC 22. Each BMC 22 receives the centralized bandwidth allocation generated by the CBM 30 via the satellite. Each BMC 22 generates a global bandwidth allocation according to the centralized and decentralized bandwidth allocations and coordination rules. The coordination rules allow the global bandwidth allocation to be consistent with the centralized and decentralized bandwidth allocations.

The global bandwidth allocation is sent to the burst plan generator 26 of the local terminal 14, 16, 18 which generates a burst plan using deterministic algorithms. For example, in a simple scenario, the burst length for each terminal in each frame can be proportional to the bandwidth allocation to this terminal. If burst length is limited to some particular values, then the burst allocation algorithm can allocate more bursts (or none) for one terminal in some frames in order to achieve required bandwidth allocations. Any deterministic algorithm, i.e. an algorithm which behaves predictably (like a state machine), may be used.

The burst plan identifies each burst position and length, and a corresponding terminal 14, 16, 18, for each frame in the AW, in order to send data related to both the first and second groups of applications. Each burst plan generator 26 is provided with the same burst plan algorithm so that two different terminals 14, 16, 18 do not send data at the same time.

This burst plan is transmitted to the schedule generator 28 which allocates packets of data waiting in the buffers to the allocated transmission bursts according to the burst plan. The packets are then sent to the satellite 12 by the local terminal. In one embodiment, packet selection, performed by the schedule generator 28, is based on packet priorities and fairness criteria. The final share of bandwidth between the applications of the first and second groups is performed by the schedule generator 28 based on the current state of the buffer. As a result, the final share performed by the schedule generator 28 can be different from the original bandwidth demands.

In one embodiment, the first group of applications comprises applications which need a robust bandwidth allocation. A robust bandwidth allocation minimizes the risk of transmission collisions. For example, the first group may comprise applications requiring stringent quality of service (QoS) such as real-time applications. Voice and/or video over Internet Protocol (IP), video conferencing, audio conferencing, and multimedia services are examples of real-time applications. The second group of applications comprises applications which may need less robustness and/or applications of which the traffic patterns are variable in time and less predictable than those of real time applications, for example. Applications such as Hypertext Transfer Protocol (HTTP) and File Transfer Protocol (FTP) are examples of applications for which a faster bandwidth allocation may be desirable. When applied to real-time and non real-time applications, the system 10 offers an improved bandwidth utilization which results in an improved effective throughput. Since the bandwidth allocation for non real-time applications is not performed by the CBM 30, the delay for transmitting data is reduced which provides better customer perception of the service, as illustrated in FIG. 3.

In order to send data in super-frame k, each terminal 14, 16, 18 sends a bandwidth request for real-time applications in a preceding super-frame, such as super-frame k-3. These requests are received by the CBM 30 at a time comprised within super-frame k-2. The CBM 30 generates the bandwidth allocation for the real-time applications and sends them in super-frame k-2. The DBM 20 of each terminal 14, 16, 18 generates and sends bandwidth requests for non real-time applications in super-frame k-2. During the time corresponding to super-frame k-1, each terminal receives the centralized bandwidth allocation for real-time applications from the CBM 30, generates the decentralized bandwidth allocation for the non real-time applications, and generates a global bandwidth allocation and a burst plan. The terminal schedules the transmission of data which is sent in super-frame k.

Figure 3:
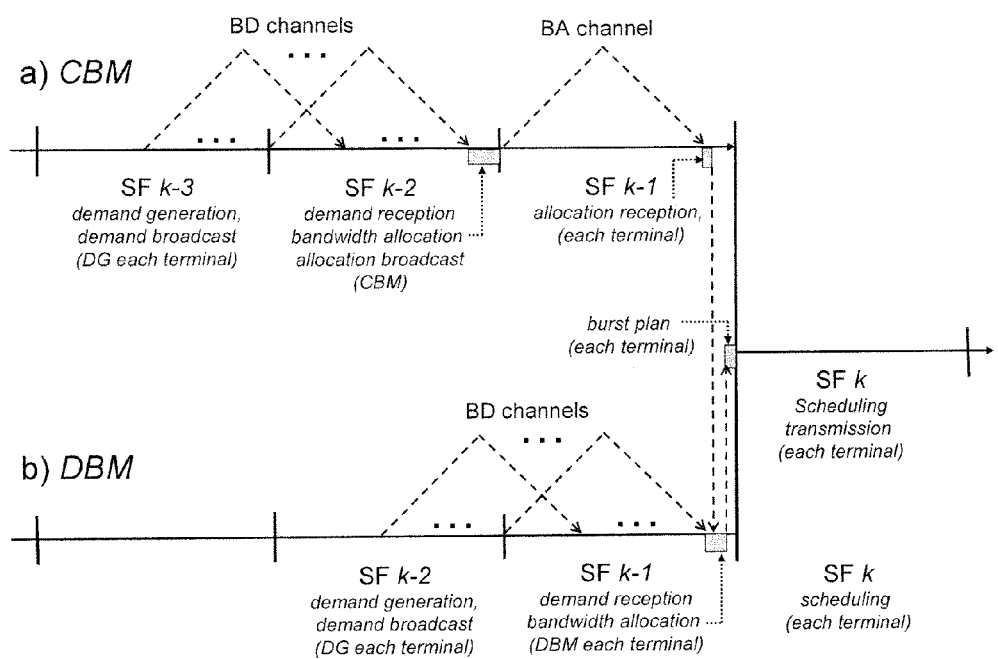
FIG. 3 illustrates the process for allocation packets to bursts in time, in accordance with one embodiment.

From FIG. 3, one can see that the period of time required to generate the bandwidth allocation for non real-time applications is shorter than that for generating real-time application bandwidth allocation by about the duration of one super-frame. Therefore, the window for the centralized bandwidth allocation may be larger than that of the decentralized bandwidth allocation. Alternatively, both windows may be equal and the total duration of the two windows may be equal to the duration of one super-frame.

Figure 4:
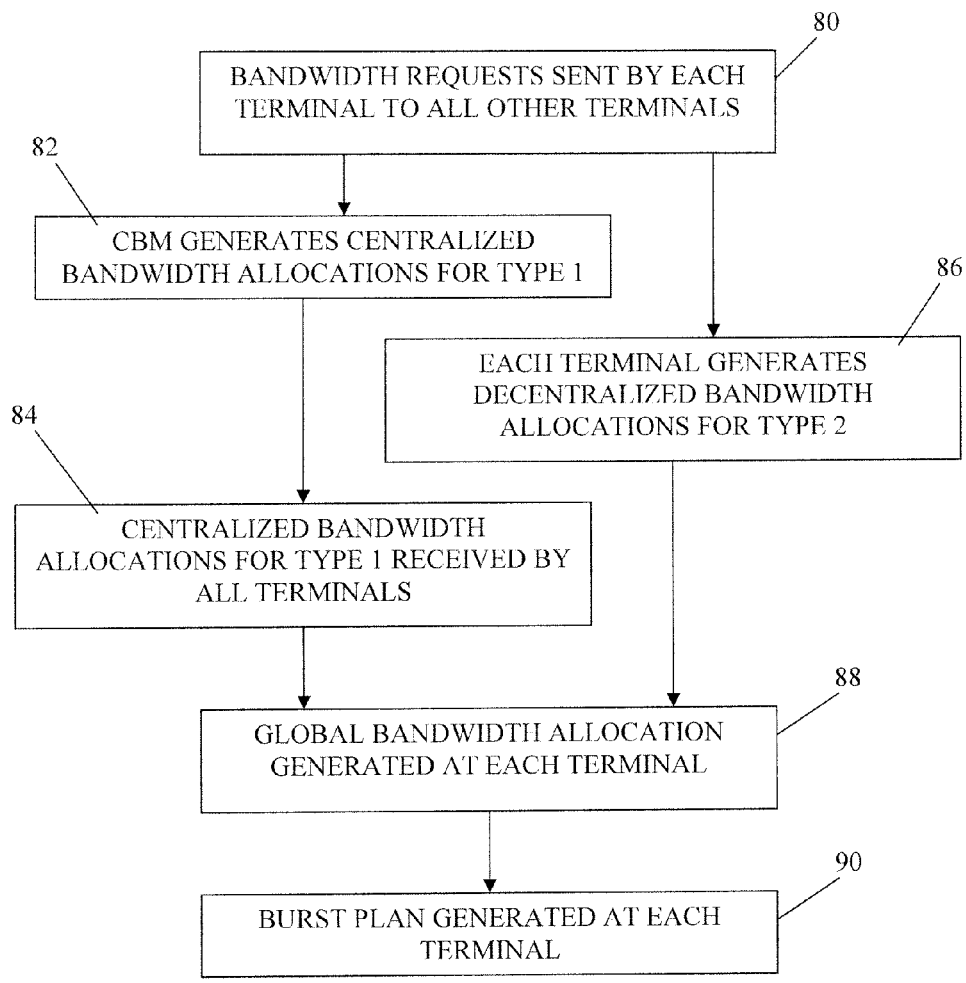
FIG. 4 is a flowchart for allocation of bandwidth and generation of a burst plan, in accordance with one embodiment.

FIG. 4 illustrates a method for determining a transmission schedule for a satellite communication system having multiple terminals. In a first step, bandwidth requests are sent by each individual terminal to all of the other terminals via the satellite 80. The satellite simply redirects the request received from one terminal to all of the other terminals. The bandwidth requests will contain those for both type 1 applications and type 2 applications. As indicated above, whether an application falls within type 1 or type 2 can be decided a variety of ways.

One of the terminals in the satellite communication system will extract the type 1 requests and generate a centralized bandwidth allocation for all of the terminals 82. This centralized bandwidth allocation is sent to all other terminals in the system 84. Meanwhile, each terminal, having the type 2 applications for all of the terminals, will generate a decentralized bandwidth allocation for type 2 applications 86 for all terminals by applying the same algorithm to the same data. Using the centralized bandwidth allocation and the decentralized bandwidth allocation, a global bandwidth allocation is generated by each terminal 88. Subsequently, a burst plan may be generated for each terminal 90.

In an alternative embodiment, the terminals will wait until receiving the centralized bandwidth allocation before generating a decentralized bandwidth allocation, given that type 1 applications have priority over type 2 applications. The BMC 22 of each terminal 14, 16, 18 receives the available bandwidth for the type 1 applications from the CBM 30. The BMC 22 may consider the decentralized bandwidth allocations for the type 2 applications performed by the local DBM 20. If there is available bandwidth, the BMC 22 allocates the remaining free bandwidth to each terminal proportionally to the general terminal reference demand. The general terminal reference demand can be defined either as the bandwidth request for the type 1 applications or as a sum of the requests for both the type 1 and type 2 applications. As a result, all available window bandwidth is allocated to the terminals 14, 16, and 18 and each terminal 14, 16, 18 knows the percentage of bandwidth allocation. However, it may be that each terminal 14, 16, 18 does not know which percentage is dedicated to the type 1 and type 2 applications.

Figure 5:
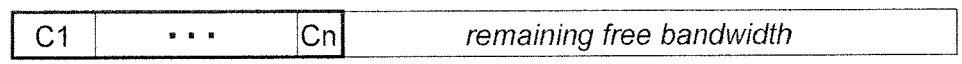
FIG. 5 illustrates the centralized bandwidth allocation, the decentralized bandwidth allocation, and the global bandwidth allocation, in accordance with one embodiment.
Figure 5:
Figure 5:
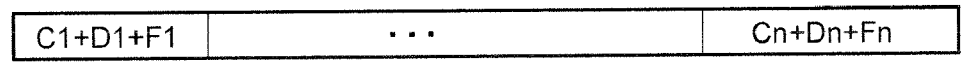

FIG. 5 illustrates an exemplary embodiment of a centralized bandwidth allocation (a), a decentralized bandwidth allocation (b), and a global bandwidth allocation (c). In the centralized bandwidth allocation, only the first portion of the available bandwidth is used for type 1 applications C1-Cn. In the decentralized bandwidth allocation, a second portion of the bandwidth is used for the type 2 applications D1-Dn. When the global bandwidth allocation is generated, the entire bandwidth has been used up.

In one embodiment, the coordination rules executed by the BMC 22 of each terminal will give the centralized bandwidth allocation priority over the decentralized bandwidth allocation in order to create the global bandwidth allocation. The coordination rules used by the BMC 22 may change over time to create a dynamic bandwidth allocation. For example, an application of type 2 may become part of the type 1 applications. Referring to the example of real-time and non real-time applications, the division between the real-time and non real-time application categories may be relaxed to allow dynamic changes in the sets of applications served by the CBM 30 and the DBM 20 of each terminal. These dynamic changes may be triggered by changes such as changes in the traffic profiles, changes in the system robustness and the like. For example, if the traffic profiles of some non real-time applications become very predictable, the CBM 30 may be in charge of the bandwidth allocation for these non real-time applications in order to improve robustness. In another example, if the transmission errors in bandwidth demand signalling channels are very rare for a particular real-time application, the DBM 20 may be in charge of the bandwidth allocation for this particular real-time application in order to improve efficiency of the bandwidth adaptation.

While the present description refers to the CBM 30 located at the terminal 14, it should be understood that the CBM 30 may be independent of any terminal 14, 16, 18 and can be located in a hub.

In one embodiment, the system 10 allows users to create a virtual private network of high-speed IP-centric data access over a widely distributed geographical area.

In one embodiment of the system 10, the terminal 18 is provided with a back-up CBM 32. The back-up CBM 32 is in charge of the centralized bandwidth allocation in case of failure of the CBM 30. The back-up CBM 32 may be provided at one terminal within the system or independently from the terminals, such as in a hub.

It should be noted that the embodiments of the invention described above are intended to be exemplary only. The present invention can be carried out as a method or can be embodied in a system. The scope of the invention is therefore intended to be limited solely by the scope of the appended claims.

I claim:

1. A method for allocating bandwidth in a satellite communication system comprising a plurality of terminals, the method comprising:
   at each one of said plurality of terminals:
      sending a local terminal bandwidth request to a centralized bandwidth manager and to all other terminals of said plurality of terminals via a satellite;
      receiving a centralized bandwidth allocation for a first group of applications from said centralized bandwidth manager;
      receiving other terminal bandwidth requests from the other terminals, extracting requests for a second group of applications, and generating a decentralized bandwidth allocation according to a set of bandwidth allocation rules common to all of said plurality of terminals; and
      generating a global bandwidth allocation using the centralized bandwidth allocation and the decentralized bandwidth allocation.

2. The method of claim 1, further comprising generating a burst plan at each one of the plurality of terminals in accordance with the global bandwidth allocation.

3. The method of claim 2, further comprising generating a schedule which allocates packets of data waiting in buffers to allocated transmission bursts according to the burst plan.

4. The method of claim 1, wherein sending and receiving is done via a super-frame structure, each super-frame comprising a plurality of frames, each frame comprising a plurality of bursts.

5. The method of claim 4, further comprising generating a burst plan at each one of the plurality of terminals in accordance with the global bandwidth allocation, and wherein the burst plan differs between frames and between super-frames.

6. The method of claim 5, wherein bursts within a same frame are allocated to different terminals.

7. The method of claim 1, wherein sending a local terminal bandwidth request to a centralized bandwidth manager and to all other terminals comprises sending the local terminal bandwidth request only to the other terminals, the centralized bandwidth manager being present in one of the other terminals.

8. The method of claim 1, wherein generating the global bandwidth allocation comprises using a set of coordination rules common to all of said plurality of terminals.

9. The method of claim 1, wherein receiving a centralized bandwidth allocation comprises receiving a percentage of the total available bandwidth to be dedicated to the first group of applications for each terminal.

10. The method of claim 1, wherein receiving a centralized bandwidth allocation comprises receiving a burst plan.

11. The method of claim 1, wherein receiving a centralized bandwidth allocation comprises receiving a bandwidth allocation proportional to a bandwidth request.

12. The method of claim 1, wherein generating a decentralized bandwidth allocation comprises taking into account the centralized bandwidth allocation to generate the decentralized bandwidth allocation.

13. The method of claim 1, further comprising dynamically setting criteria to classify applications for transmission as belonging to the first group or the second group.

14. The method of claim 1, wherein the first group of applications comprises real-time applications and the second group of applications comprises non real-time applications.

15. A terminal for use in a satellite communication system with a plurality of terminals, the terminal comprising:
- a request generator adapted to generate a local terminal bandwidth request, the local terminal bandwidth request comprising a request for a first group of applications and a second group of applications, and to send the local terminal bandwidth request to other terminals in the satellite communication system;
- a decentralized bandwidth manager adapted to receive other terminal bandwidth requests from the other terminals, extract requests for the second group of applications from the other terminal bandwidth requests and the local bandwidth request, and generate a decentralized bandwidth allocation for each one of the plurality of terminals according to a set of bandwidth allocation rules common to all of the plurality of terminals; and
- a bandwidth management coordinator adapted to receive a centralized bandwidth allocation applicable to the first group of applications, and to generate a global bandwidth allocation according to a set of coordination rules common to all of the plurality of terminals.

16. The terminal of claim 15, further comprising a burst plan generator for generating a burst plan in accordance with the global bandwidth allocation.

17. The terminal of claim 16, further comprising a schedule generator for generating a schedule which allocates packets of data waiting in buffers to allocated transmission bursts according to the burst plan.

18. The terminal of claim 15, sending and receiving data is done using a super-frame structure, each super-frame comprising a plurality of frames, each frame comprising a plurality of bursts.

19. The terminal of claim 18, wherein the global bandwidth allocation allocates frames of a same super-frame to different terminals.

20. The terminal of claim 18, wherein the global bandwidth allocation allocates bursts of a same frame to different terminals.

21. The terminal of claim 15, further comprising a centralized bandwidth manager adapted to receive the bandwidth requests from the plurality of terminals, extract requests for the first group of applications, generate the centralized bandwidth allocation, and transmit the centralized bandwidth allocation to the plurality of terminals.

22. The terminal of claim 15, further comprising a back-up centralized bandwidth manager to act as a back-up in case of failure of a main centralized bandwidth manager in the satellite communication system.

23. The terminal of claim 15, wherein the decentralized bandwidth manager is adapted to take into account the centralized bandwidth allocation when generating the decentralized bandwidth allocation.

24. The terminal of claim 15, wherein the decentralized bandwidth manager is adapted to dynamically adjust criteria used to classify applications for transmission as belonging to the first group or the second group.

25. The terminal of claim 15, wherein the first group of applications comprises real-time applications and the second group of applications comprises non real-time applications.

26. A satellite communication system comprising:
- a plurality of terminals, each terminal comprising:
  - a request generator adapted to generate a local terminal bandwidth request, the local terminal bandwidth request comprising a request for a first group of applications and a second group of applications, and to send the local terminal bandwidth request to other terminals in the satellite communication system;
  - a decentralized bandwidth manager adapted to receive other terminal bandwidth requests from the other terminals, extract requests for the second group of applications from the other terminal bandwidth requests and the local bandwidth request, and generate a decentralized bandwidth allocation for each one of the plurality of terminals according to a set of bandwidth allocation rules common to all of the plurality of terminals; and
  - a bandwidth management coordinator adapted to receive a centralized bandwidth allocation applicable to the first group of applications, and to generate a global bandwidth allocation according to a set of coordination rules common to all of the plurality of terminals; and
- a centralized bandwidth manager adapted to receive the bandwidth requests from the plurality of terminals, extract requests for the first group of applications, generate the centralized bandwidth allocation, and transmit the centralized bandwidth allocation to the plurality of terminals.

27. The system of claim 26, wherein the centralized bandwidth manager resides in one of the plurality of terminals.

28. The system of claim 26, wherein the centralized bandwidth manager resides in a hub.

* * * * *